(12) United States Patent
Haas et al.

(10) Patent No.: US 9,643,175 B2
(45) Date of Patent: May 9, 2017

(54) APPARATUS FOR A FLUIDIZED ION EXCHANGE BED SYSTEM

(71) Applicant: Renix Inc., London (CA)

(72) Inventors: Christine Haas, London (CA); David Andrew Prince, London (CA); Amarjeet Bassi, London (CA)

(73) Assignee: Renix Inc., London, ON ( * ) Notice: Subject to any disclaimer, the term of this patent is extended or adjusted under 35 U.S.C. 154(b) by 415 days.

(21) Appl. No.: 14/116,011

(22) Filed: Nov. 6, 2013

(65) Prior Publication Data

US 2014/0076816 A1    Mar. 20, 2014

Related U.S. Application Data

(63) Continuation-in-part of application No. PCT/CA2012/000417, filed on May 3, 2012.
(Continued)

(51) Int. Cl.

| | | |
|---|---|---|
| B01J 47/10 | (2017.01) |
| B01J 49/00 | (2017.01) |
| B01J 47/026 | (2017.01) |
| C02F 1/42 | (2006.01) |
| B01J 8/20 | (2006.01) |
| B01J 8/28 | (2006.01) |
| B01J 8/38 | (2006.01) |
| B01J 49/10 | (2017.01) |
| B01J 49/50 | (2017.01) |

(52) U.S. Cl.
CPC .......... *B01J 47/10* (2013.01); *B01J 8/20* (2013.01); *B01J 8/28* (2013.01); *B01J 8/388* (2013.01); *B01J 47/026* (2013.01); *B01J 49/10* (2017.01); *B01J 49/50* (2017.01); *C02F 1/42* (2013.01); *B01J 2208/00592* (2013.01); *B01J 2208/00601* (2013.01)

(58) Field of Classification Search
CPC ...... B01J 47/10; B01J 47/026; B01J 49/0026; B01J 8/20; B01J 8/28; B01J 8/388; B01J 49/0065; B01J 2208/00592; B01J 2208/00601; B01D 15/02; C02F 1/42
USPC ................ 210/189, 269, 675, 676
See application file for complete search history.

(56) References Cited

U.S. PATENT DOCUMENTS

| | | |
|---|---|---|
| 3,378,339 A | 4/1968 | Yamashiki |
| 3,879,287 A | 4/1975 | Porter |

(Continued)

OTHER PUBLICATIONS

Chase, H.A., "Purification of proteins by adsorption chromatography in expanded beds", TIBTECH 12, 296-303 (1994).
(Continued)

*Primary Examiner* — Matthew O Savage
(74) *Attorney, Agent, or Firm* — Gowling WLG (Canada) LLP (57) ABSTRACT

A novel apparatus for an ion exchange system is provided. The apparatus comprises a first column for housing a first fluidized bed through which particles are flowed countercurrently to an ion-containing fluid to yield ion-loaded particles, a second column through which the ion-loaded particles are flowed countercurrently to an eluent fluid to yield regenerated particles, and a transport section which transfers the regenerated particles for re-introduction into the first column to repeat the ion exchange cycle in a continuous manner. A continuous method of ion exchange is also provided.

11 Claims, 8 Drawing Sheets

Related U.S. Application Data (60) Provisional application No. 61/483,364, filed on May 6, 2011.

(56) References Cited

U.S. PATENT DOCUMENTS

| | | |
|---|---|---|
| 4,085,042 A | 4/1978 | Misumi et al. |
| 4,269,716 A | 5/1981 | Gurian |
| 4,279,755 A | 7/1981 | Himsley |
| 4,340,485 A * | 7/1982 | Ikeda ............... B01D 15/02 210/189 |
| 5,126,056 A | 6/1992 | Carlson |
| 6,716,344 B1 | 4/2004 | Bassi et al. |
| 7,261,811 B2 | 8/2007 | Nakhla et al. |
| 7,862,715 B2 | 1/2011 | Drake |

OTHER PUBLICATIONS

Mark A. Burns and David J. Graves, "Continuous Affinity Chromatography Using a Magnetically Stabilized Fluidized Bed", Biotechnology Progress 1, 95-103 (1995).

Gordon, N. F., H. Tsujimura and C. L. Cooney, "Optimization and Simulation of Continuous Affinity Recycle Extraction", Bioseparation 1, 9-12 (1990).

\* cited by examiner

APPARATUS FOR A FLUIDIZED ION EXCHANGE BED SYSTEM

FIELD OF THE INVENTION

The present invention relates to an apparatus and ion exchange system, and more specifically, to a system comprising a liquid-solid circulating fluidized bed arrangement.

BACKGROUND TO THE INVENTION

Fluidized beds have been used for a number of different applications such as gas-liquid, gas-liquid-solid contactors and to carry out a variety of different processes including chemical reactions such as ion exchange.

Fluidized beds have found application in ion exchange processes. For example Chase, H. A., "Purification of Proteins by Adsorption Chromatography in Expended Beds", TIBTECH 12, 296-303 (1994) describes a batch ion exchange process using a conventional fluidized bed for recovering proteins from whole fermentation broth with the presence of bacterial cells. It eliminates the difficult solids separation step and recovers the desired products directly from unclarified whole broth. This process is a batch process employing a conventional fluidized bed.

Burns, M. A. and D. J. Graves, "Continuous Affinity Chromatography Using a Magnetically Stabilized Fluidized Bed", Biotechnology Progress 1, 95-103 (1995) suggested a two-column magnetically stabilized fluidized bed system for the continuous chromatography of biochemical products. The magnetically stabilized fluidized bed system is considered to be complicated and costly.

Gordon, N. F., H. Tsujimura and C. L. Cooney, "Optimization and Simulation of Continuous Affinity Recycle Extraction", Bioseparation 1, 9-12 (1990) describes a process using mixed reactors as opposed to a fluidized bed and reported the continuous affinity recycle extraction of proteins using well-mixed reactors. This system, although simple and easy to control, has the disadvantage of a stirred tank system—the ion exchange efficiency is low and large processing volumes are essential for even a moderate throughput requirement.

Further, various forms of apparatus have been described for use in such chemical processes.

Porter and Robert, U.S. Pat. No. 3,879,287, "Continuous ion exchange process and apparatus" (1975) relates to an apparatus for continuous ion exchange. However, the process described is a semi-continuous process as the recommended eluting means is a batch wise conventional fixed bed ion exchange process.

Himsley and Alexander, U.S. Pat. No. 4,279,755: Continuous countercurrent ion exchange process (1993) teaches a continuous countercurrent ion exchange process for adsorbing ions of interest onto ion exchange particles from a feed liquor containing ions which when adsorbed on the particles cause the density of the particles to increase. The process comprises the steps of (1) flowing the feed liquor upwardly through a main bed of ion exchange resin particles contained in a main chamber of an absorption column and thereby maintaining the bed in fluidized state; (2) continuously collecting the denser loaded particles from the lower region of the absorption column; (3) passing an outflow of the feed liquor from the upper region of the main chamber upwardly into the lower region of the polishing chamber containing a secondary bed of fluidized ion exchange resin particles whereby residual ions of interest are polished from the liquor, and (4) producing a barren liquor flowing out of the upper region of the polishing chamber. While this process offers continuous flow of feed liquor to the system, the movement, stripping and regeneration of the loaded ion exchange particles device is done on an intermittent basis.

Bassi et al., U.S. Pat. No. 6,716,344 describes a liquid solid continuous fluidized bed (LSCFB) comprising a conventional fluidized bed for adsorption of ions and a riser co-current fluidized bed for desorption of ions and regeneration of ion exchange particles. Ion exchange particles circulate continuously between the fluidized beds. The LSCFB is useful for continuous recovery of ions of interest, however, the nature of the design results in low particle regeneration efficiency, it consumes unfeasibly large quantities of fluids, and in most applications, it results in significant dilution of process streams.

SUMMARY OF THE INVENTION

An improved apparatus and circulating fluidized bed system for continuous, counter-current liquid-solids contact and interaction has been developed and is referred to herein as a Vertically Arranged Liquid-Solids Circulating Fluidized Bed (VA-LSCFB) ion exchanger.

In a first aspect, the present invention relates to an apparatus for a fluidized bed system comprising:

a first column for housing a first fluidized bed, said first column comprising a first particle-feeding means to feed ion exchange or adsorbent particles into an upper region of said first column and a first fluid-feeding means to feed a first ion-containing fluid into a lower region of said first column to form a fluidized bed in the first column, said first column further comprising a first fluid outlet in the upper region at a height above the first particle-feeding means, said lower region being remote from said upper region such that said solids and said fluid flow counter-currently in the first fluidized bed, wherein the upper region comprises a first end of the first column and the lower region comprises a second end of the first column;

a second column for housing a second fluidized bed, a second particle-feeding means to feed particles into an upper end of said second column and a second fluid-feeding means to feed a second ion-eluting fluid into a lower end of said second column to form a second fluidized bed in the second column, a fluid outlet at the upper end of the second column at a height above the second particle-feeding means, said upper and lower ends being remote such that said particles and said fluid flow counter-currently through said second column;

a first means connecting the first and second columns such that the second end of said first column is connected to the upper end of said second column, said first connecting means being adapted to permit passage of particles and prevent passage of said first fluid into said second column;

a second means connecting the lower end of said second column to a transport section, said second connecting means being adapted to permit passage of particles and prevent passage of said second fluid; and a transport section which connects to the upper region of the first column, said transport section comprising means to hydraulically move said particles upwardly into a liquid-solids separator to separate the particles from fluid prior to entry into the first column via the first particle-feeding means.

Preferably said first and second columns are substantially vertical columns. The preferred arrangement of the first and second columns is such that the first column is situated at a height above at least a portion of the second column, and preferably, is situated at a height above a large portion of the second column. In one preferred embodiment, the lower region of the first column is substantially adjacent to the upper end of the second column.

Preferably said first column comprises an ion exchange or adsorbent particle bed for separating ions of interest and said second column comprises a fluidized bed that functions to regenerate ion-loaded particles by elution of ions of interest.

Preferably, the first means connecting the first and second columns is substantially adjacent to the second end of the first column and the upper end of the second column.

Optionally the first means connecting said first and said second columns includes a washer for washing ion exchange or adsorbent particles which is adjacent to the second end of said first column before they are introduced into the second column.

Optionally, in cases where elution of ions of interest requires high levels of ionic driving force, the second column may comprise multiple fluid-feeding inlets, preferably arranged in series, separated from each other along the column for introduction into the system of the eluting fluid.

Optionally the second connecting means comprises a washer to wash particles from the second column before they are introduced into the transport section. The washer may be located adjacent to the lower end of the second column.

Optionally said means to hydraulically move particles from the transport section to the upper region of said column comprises one or more fluid inlets for injection of transport fluid into the transport section, and optionally comprises an inlet for compressed gas. The fluid inlet may comprise primary and auxiliary inlets.

In a case in which a high quality product is required, the separator may include an inlet at the bottom of the separator for the introduction of a blocking fluid into the separator, the function of which is to prevent transport fluid from being carried into the first column by the particles or to otherwise prepare the particles for entry/re-entry into the first column (e.g. such as pH conditioning of the particles).

In another aspect of the invention, a continuous method for recovering ions of interest from a fluid is provided. The method comprises the steps of:

i) passing ion exchange or adsorbent particles in a downward flow countercurrent to the flow of the fluid to yield ion-loaded particles;

ii) removing the fluid from said ion-loaded particles;

iii) passing said ion-loaded particles in a downward flow countercurrent to an eluting fluid for desorption of said ions of interest from said particles to provide regenerated particles;

iv) removing the eluting fluid containing the desorbed ions of interest from said regenerated particles; and iv) transporting said regenerated particles for use to repeat steps i)-iv) in a continuous manner.

The present system and method advantageously provide continuous countercurrent separation of ions of interest and uninterrupted regeneration and circulation of solid particles through the system.

Further features and advantages will be evident from the following detailed description of the preferred embodiments of the present invention taken in conjunction with the accompanying drawings.

DESCRIPTION OF THE PREFERRED EMBODIMENT

Figure 1:
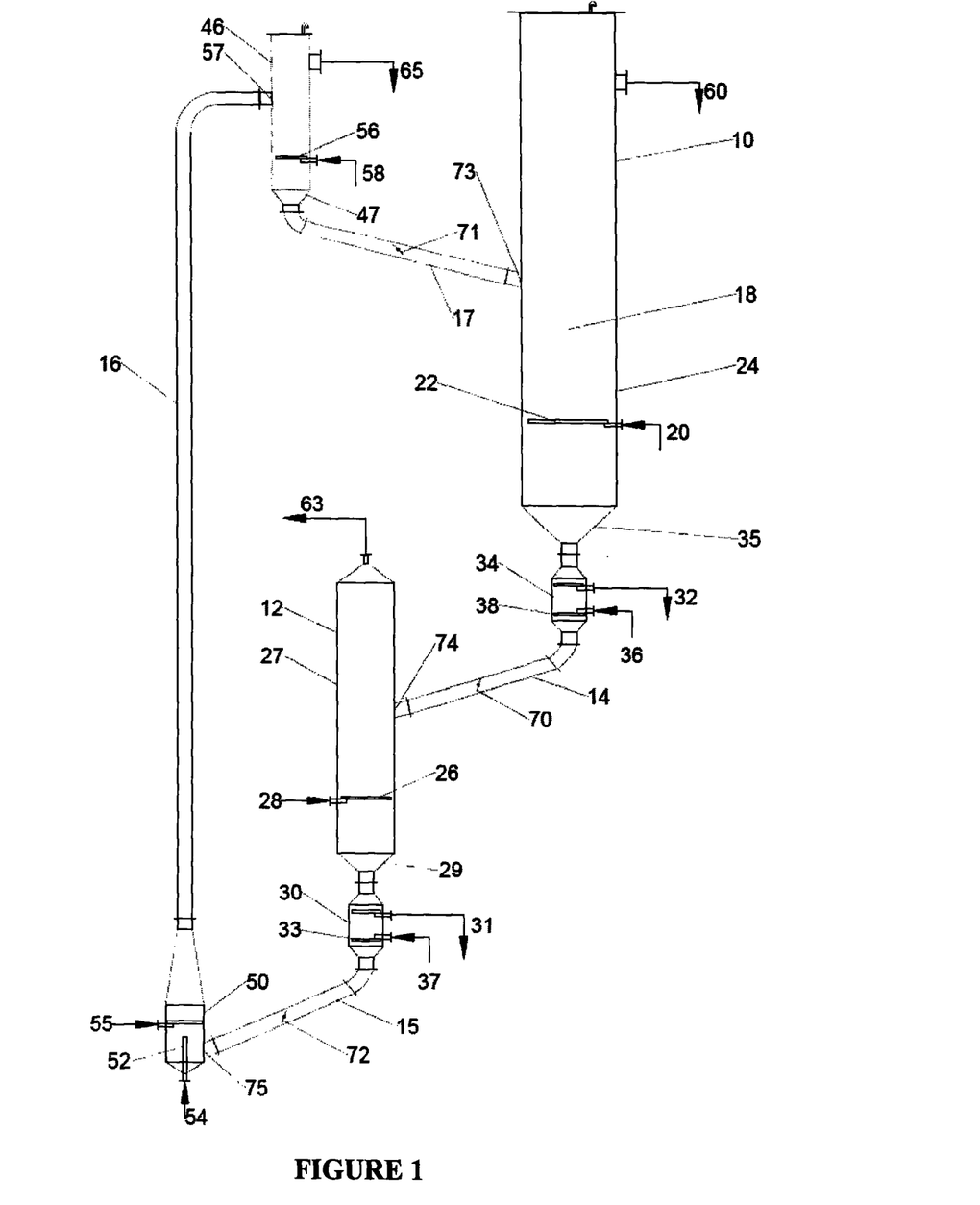
FIG. 1 is a schematic illustration of an apparatus in accordance with an embodiment of the present invention.

Referring to FIG. 1, an embodiment of the present invention is shown. An apparatus 100 useful for ion exchange comprises a first column 10 and a second column 12 interconnected generally by solid transfer and washing systems as will be described. First and second fluidized beds are formed in the first and second columns 10, 12, respectively, when ion exchange or adsorbent solid particles 18 are input into each column along with fluids, such as feed liquor and eluting fluids.

The first column 10 comprises a first particle-feeding transfer line 17 by which solid particles 18 are input into the upper region of the first column 10 (e.g. within the region above the midpoint of the first column 10) via inlet 73 for downward flow within the first column 10. The first column 10 also comprises a fluid-feeding inlet 22 to feed a first fluidizing fluid, e.g. a feed liquor 20, into the lower region 24 for upward flow in the first column 10 (e.g. within the region below the midpoint of column 10). The particles 18 and feed liquor 20 flow counter-currently through the first column 10. The feed liquor is removed from the first column 10 via outlet 60 located at the top of the first column 10.

A first washer 34 is optionally connected to the bottom end 35 of the first column 10. The washer 34 may be any region or section suitable to wash ion-loaded particles, for example, a short column, Wash fluid from a source 36 is injected into the washer 34 via first wash (adsorber) inlet 38 positioned at the bottom of the washer 34. The injected wash fluid is flowed counter-current to the particles 18 by the selection of appropriate inlet and outlet flow rates and equipment configuration. Excess fluid, such as feed liquor 20, is removed from the washer 34 through a screened outlet 32. The screen size is selected based on the size of solid particles being used in the apparatus 100 such that particles are retained within the washer 34 while excess fluid is removed.

The primary function of the optional first washer 34 is to prevent the feed liquor 20 from being carried into the second fluidized bed 12 by the particles 18. The washer 34, thus, is included when the conditions of the specific application of the system call for this level of separation. The optional washer 34 may also be used to scour or clean solid particles in those cases where the feed liquor 20 (first fluidizing fluid) contains compounds that cause substantial resin fouling such as silicates, organics, bacterial or other compounds.

A first connecting means, e.g. transfer line 14, extends from the bottom of the first column 10 (or from the bottom of washer 34, if present) and connects the first column 10 to the upper end of the second column 12 including inlet 74

(second particle-feeding means). Inlet 74 is located at a point above the mid-region of the second column 12. The first transfer line 14 is adapted to permit passage of particles 18 and to prevent passage of fluid, e.g. feed liquor, from the first column 10 into the second column 12. In one embodiment, the first transfer line 14 operates as a packed moving bed and is configured to comprise a first dynamic seal between the second fluidized bed in the second column 12 and the first fluidized bed in the first column 10. For the purposes of the present system, the term "dynamic seal" is used herein to refer to an arrangement to prevent the passage of one gas or liquid into a second liquid through the control of pressures and mixing at the gas/liquid and/or liquid/liquid interface. The dynamic seal is used to achieve separation of liquids from the first and second fluidized beds (e.g. to prevent the feed liquor 20 from the first fluidized bed from entering the second fluidized bed), as well as to adjust and control the solids circulation rate and system productivity. In the VA-LSCFB ion exchange system of the present invention, the first transfer line 14 comprises a valve 70 for use to control, in part, the first dynamic seal.

A second fluidizing fluid (eluent) is introduced into the lower end of the second column 12 through one or more second fluid-feeding inlets 26 and is flowed counter-currently to particles 18 entering the second column 12 through inlet 74. The particles 18 are regenerated by the countercurrent exposure to the eluent, e.g. the adsorbed ions of interested are desorbed from particles 18 by the eluent. In cases where elution of the ions of interest requires a high level of ionic driving force, the second column 12 may include multiple inlets 26, preferably arranged in series, separated from each other in the lower end of the second column 12 for introduction of eluting fluid into the system in order to effectively drive ion removal, concentrate eluent, and achieve particle regeneration.

Excess eluent is removed from the second column 12 through a screened outlet 63 at the top of the second column 12. The outlet 63 is located above inlet 74 such that a freeboard section of sufficient height is established between the outlet 63 and inlet 74 to substantially eliminate carryover of particles 18 through the outlet 63. The screen size of the outlet 63 is selected based on the size of solid particles 18 being used such that particles 18 are retained within the system while excess eluent is removed.

A second optional washer 30 extends from the bottom end 29 of the second column 12 and may also be any suitable region or section for washing the particles. Wash fluid from a source 37 is injected into the washer 30 via second wash (desorber) inlet 33 which is located at the bottom of the second washer 30. Excess wash fluid is removed from the second washer 30 through a screened outlet 31 which comprises a screen size selected to retain the solid particles 18 being used in the system within the washer 30.

A second connecting means, e.g. second transfer pipe 15, connecting the second column 12 to a transport section 50, extends from the bottom of washer 30 (or from the bottom of the second column 12 if a second washer is not present) to the transport section 50. The second transfer pipe 15 is adapted to permit passage of particles 18 and prevent passage of fluid, e.g. eluent. In one embodiment, the second transfer pipe 15 comprises a second dynamic seal between the second fluidized bed in the second column 12 and the transport section 50. In the system of the present invention, the second transfer pipe 15 comprises a valve 72 for use to control, in part, the second dynamic seal. Transfer pipe 15 feeds particles into the transport section 50 via inlet 75.

The transport section 50 comprises a riser 16 which permits transport of particles for entry back into the first column 10. Transport fluid is injected from source 54 into the transport section 50 via inlet 52 to hydraulically transfer particles 18 upwardly through riser 16. The transport fluid inlet 52 optionally consists of two inlets, a primary inlet and an auxiliary inlet. The primary inlet may be a nozzle which projects into the riser section 16, and the auxiliary inlet may be a perforated plate at the bottom of the transport section 50 which is used to stir up the particles entering the bottom of the transport section 50. A compressed gas such as air or nitrogen may optionally be introduced into the transport section 50 via inlet 55 to aid with the hydraulic transport of particles 18.

The riser 16 connects to a liquid-solids separator 46, such as a vortex type separator, at inlet 57. Separator 46 functions to separate the particles 18 from transport fluid prior to entry into the first column. The separator 46 comprises at its upper end, a fluid outlet 65 for removal of separated transport fluid, and at its lower end, an outlet 47 for solid particles. Inlet 57 is sufficiently below the outlet 65 to maintain a freeboard section in the upper region of the separator 46 of sufficient height to substantially eliminate carryover of particles 18 through the outlet 65. The separator 46 optionally includes an inlet 56 for injection of a blocking fluid, such as water, buffer or excess feed liquor, from a source 58. The function of the blocking fluid is to prevent transport fluid from being carried into the first column by the particles or to otherwise prepare the particles for entry into the first column (e.g. pH conditioning of the particles). A third connection means, e.g. transfer pipe 17, connects outlet 47 of the separator 46 to the first column 10 and functions to deliver regenerated particles 18 into the top of first fluidized bed within first column 10 via inlet 73. Inlet 73 is located sufficiently below outlet 60 to maintain a freeboard section in the upper region of the first column 10 of sufficient height to substantially eliminate carryover of particles 18 through the outlet 60. The third transfer pipe 17 may be adapted to prevent passage of transport fluid into the first column while permitting passage of regenerated particles. In one embodiment, the third transfer pipe 17 comprises a third dynamic seal between the separator 46 and the first column 10. In this embodiment, the third transfer pipe 17 may comprise a valve 71 for use to control, in part, the third dynamic seal.

The first column 10 or the second column 12 may include the addition of internal elements within the column such as baffles, mixers, contactors, or distributors of varying design, if necessary, for the purpose of controlling liquid-particle contact within the column, as may be the case, for example, under conditions of slow exchange kinetics.

The operation of the invention will be described below in relation to the ion exchange process; however, as one of skill in the art will appreciate, it may be used in other potential applications.

In the process of ion exchange, a first fluidized bed is formed in the first column 10 of ion exchange apparatus 100 by introducing ion exchange particles 18 into the upper region of the first column 10 via transfer pipe 17 and a feed liquor 20 into the lower region 24 of the first column 10 via inlet 22, i.e. the feed liquor 20 and particles 18 are introduced at opposite ends of the first column 10. Particles 18 are selected to be appropriate to bind target ions in the feed liquor 20 for removal of such ions from the feed liquor.

The first fluidized bed is sized based on the characteristics of the ion-containing fluid, such as the concentration of ions of interest or the presence of competing ions; the characteristics of the ions of interest, such as their selectivity; and the characteristics of the ion exchange particles, such as their particle exchange capacity. Generally, the first fluidized bed is sized to achieve an appropriate ratio of particles to fluid, and an appropriate liquid residence time and particle residence time in order to capture the desired level of ions of interest, resulting in either complete or partial removal. As one of skill in the art will appreciate, bed sizing can vary widely depending on the application of the apparatus, for example, the bed may be less than 0.5 cubic meter for an application with a low feed ion concentration, or 10 cubic meters or higher for an application with a high feed ion concentration.

The falling particles 18 and the up-flowing feed liquor 20 contact counter-currently and target ions in the feed liquor 20 are bound by the ion exchange particles 18 in the first fluidized bed. The deionized liquor is removed from the system at the top of the first column 10 through outlet 60 for downstream processing, use, or discard. The ion-loaded particles 18 fall into the optional washer 34 at the base of the first column 10. Wash fluid injected into washer 34 via inlet 38 is flowed counter-current to the particles 18 by the selection of appropriate inlet and outlet flow rates and equipment configuration, and are then transferred via first transfer pipe 14 to the upper end of the second column 12. The first transfer pipe 14 located between the second column 12 and the first column 10, which may operate as a packed moving bed comprising a first dynamic seal, prevents the entry of feed liquor 20 into the second column 12.

The second fluidizing eluent, selected to remove the target ions bound to the particles 18, is injected into the lower end of the second column 12 through inlet(s) 26 and is flowed in an upward direction counter-currently to the downward flow of loaded ion exchange particles 18 to form a second fluidized bed within the second column 12. This results in removal of target ions from particles 18 and regeneration of the particles 18. The ion-containing eluent is removed from the second column 12 through outlet 63 and may be subjected to further downstream processing, use, or discard. The regenerated ion exchange particles 18 are optionally washed in second washer 30. The wash fluid injected into washer 30 via inlet 33 is flowed counter-current to the particles 18 by the selection of appropriate inlet and outlet flow rates and equipment configuration. The washed particles 18 are transported through the second transfer pipe 15 which may operate as a packed moving bed comprising a second dynamic seal to permit the entry of regenerated particles and prevent the passage of eluent into the transport section 50.

The second fluidized bed is sized based on the characteristics of the eluent, such as concentration; the characteristics of the ions of interest, such as the ionic charge; and the characteristics of the ion exchange particles, such as the particle exchange capacity, to achieve an appropriate ratio of particles to fluid, liquid residence time and particle residence time, in order to accomplish the desired level of particle regeneration.

The regenerated particles are then hydraulically transported upwardly by injection of transport fluid into the transport section 50 via inlet 52, optionally assisted by injection of gases via inlet 55, through riser 16 to liquid-solids separator 46. The liquid-solids separator 46 functions to separate the regenerated particles 18 from the transport fluid. The separator may be any type of separator such as a vortex or hydraulic cyclone separator. Separated fluid, such as transport fluid, is eliminated through separator outlet 65 located in the upper end of the separator at a level appropriately relative to that of the outlet 60 in the upper region of the first column 10 to maintain the appropriate pressure balance within the system. To prevent the loss of particles 18 through the separator outlet 65, a stainless steel mesh (not shown) is preferably used to cover the separator outlet 65. Blocking fluid may be introduced into the separator 46 via inlet 56.

The regenerated particles 18 are introduced/re-introduced into the first column 10 through the third transfer pipe 17, which may comprise a dynamic seal, via inlet 73. The regenerated particles 18 are flowed downwardly through the first fluidized bed countercurrently to upwardly flowing feed liquor 20 to repeat the cycle of ion removal from the feed liquor and subsequent regeneration of particles through the VA-LSCFB system.

As one of skill in the art will appreciate, the rate of circulation of the particles, and the flow rates of fluids within the system, will vary depending on the feed and product characteristics.

In certain circumstances, based on the characteristics of the ion-containing fluid, ions of interest or eluting fluid, or based on the operating conditions of the system such as the presence of solids or foulants, the formation of by-products, or other process conditions, the function of the first and second columns of the apparatus may be reversed, such that the second column is used for the capture of ions of interest and the first column is used for the regeneration of particles.

The present VA-LSCFB system has many advantages. At the outset, the system provides a means to conduct continuous method of ion exchange in which ion exchange or adsorbent particles are introduced into the system to remove target ions from a feed liquor, are regenerated continuously by ion removal and recirculated for reuse to remove target ions from the feed liquor.

A major advantage of the VA-LSCFB system is realized in that the VA-LSCFB system separates elution of regenerated ion exchange particles from the upward transport of these regenerated particles. By the provision of a second fluidized bed that is not a riser fluidized bed, the regeneration of the particles is more efficient, significantly reducing the consumption of chemicals (e.g. eluent) required for particle regeneration. In addition, in the present VA-LSCFB, the second fluidized bed operates as a counter-current bed, which provides a strong driving force for elution of ions of interest, further reducing the consumption of chemicals required for particle regeneration.

In addition, the second column of the VA-LSCFB may optionally be equipped with multiple eluent inlets arranged in series to concentrate eluent and strongly drive ion removal and particle regeneration within the second fluidized bed. This can be a particularly important feature in the case where a strong elution driving force is necessary to achieve ion removal from particles, e.g. elution of proteins from strong base anionic particles (resins).

A further advantage of the VA-LSCFB is provision of optional washing sections designed to minimize dilution of process streams throughout the system, thereby reducing downstream processing costs.

The VA-LSCFB is designed for use with most ion exchange or adsorbent type resins including, but not limited to, cationic, anionic, weak, strong, gel-type, macroporous, dense core, or other similar solid particles. The VA-LSCFB is thus suitable for use to remove many different target ions from a wide variety of feed liquors or fluids.

Suitable feed liquors/fluids may contain one or more ions of interest. Examples of feed fluids include, but are not limited to, any source or type of water, an in-process or finished product stream in food, beverage, nutritional, pharmaceutical, biofuel, agricultural, ingredient, or basic chemical processing, an organic solution, a fermentation broth, mine water, industrial processing or ingredient water, wastewater, and the like. Target ions of interest for removal from such feed liquors include, but are not limited to, metal ions, mineral ions, organic acids, color bodies, proteins, amino acids, enzymes, phenolics, salts, alcohols, or other ionic compounds or contaminants.

Suitable eluent fluids generally include eluents, buffered or unbuffered, suitable for target ion removal and regeneration of the solid ion exchange particles selected for use in the system. Examples of suitable eluents include, but are not limited to, acids such as HCl and $H_2SO_4$, bases such as NaOH, salts such as NaCl or KI, or other ionic solutions.

Having described the invention, modifications will be evident to those skilled in the art without departing from the spirit of the invention as defined in the appended claims.

Embodiments of the invention are described by way of the following specific example which is not to be construed as limiting.

Example 1

Conductivity Profiling of a VA-LSCFB Ion Exchanger with NaCl

The use of a VA-LSCFB ion exchanger in accordance with an embodiment is described. The VA-LSCFB ion exchanger is as generally shown in FIG. 1. Although the particulars may vary, the particulars of the exchanger used in this example are as follows. The first column comprised a glass column of I.D. 4.4 cm and 91 cm in height. The feed inlet was a standpipe with four outlets evenly distributed into the column diameter, and located 16 cm from the bottom of the column. The solid particle inlet was located 51 cm from the top of the column.

The first optional washer was a glass bulb 8 cm in height and 3.5 cm in diameter, connected to the bottom of the first column through a funnel 1.25 cm in diameter and 1.5 cm in height. The wash inlet was a standpipe with four inlets evenly distributed into the washer diameter. Two outlets were located in close proximity to the funnel at the top of the washer. The bottom of the washer was connected to the top of the second column using 2 cm I.D. tubing, 14 cm in length.

The second column comprised a glass column 3 cm in diameter, and 33 cm in height. The inlet to the second column was a standpipe with four inlets evenly distributed into the second column diameter with approximately 14 cm from the bottom of the column. An outlet from the second column was located at the top of the bed.

The optional second washer was 3.5 cm in diameter and 11 cm in height integrated directly with the bottom of the second column. Wash fluid entered into the washer through a standpipe 3.5 cm high, located in the bottom of the washer. The bottom of the washer was connected to the transport section using 1 cm I.D. tubing, 20 cm in length.

The transport section comprised a glass inlet section 5 cm high into which transport fluid entered through a standpipe 4 cm high. An optional compressed air inlet was located at the top of the inlet section. The top of the inlet section was connected to a 1 cm diameter riser tubing, 164 cm long, which was connected to the liquid-solid separator 18 cm from the top.

The liquid-solid separator was 3.8 cm in diameter and 47 cm high. The effluent outlet was located 10 cm from the top of the separator, allowing sufficient height from the inlet tubing from the second washer to allow for creation of a free-board section with no solid particles. The bottom of the liquid-solid separator included an optional inlet for the introduction of blocking fluid as described, and was connected to the solid particle inlet of the first column using tubing 1.5 cm I.D. and 30 cm in length.

Conductivity is the measurement commonly used to demonstrate the operation of an ion exchange system. The above system was used with solutions of NaCl to conduct system conductivity profiling that demonstrates the achievement and maintenance of the necessary fluid dynamics, dynamic seals, movement and separation of fluids and resins. For this demonstration, fresh Lewatit MP 600 strong-base Type II macroporous anionic resin was used. Once the system was brought into steady state operation using known techniques, NaCl solution was introduced first through the feed inlet 22 and conductivity of all system outlets was measured for a period of 120 minutes. The NaCl was flushed from the system, and then introduced through the eluent inlet 26 and conductivity of all system outlets was measured for a period of 120 minutes. The same procedure was used for the introduction of NaCl through wash liquid inlet(s) 38/33, transport fluid inlet 52 and blocking fluid inlet 56. The following conditions were used:

TABLE 1

| NaCl Solution | |
|---|---|
| Concentration - NaCl | 0.25M |
| Conductivity | 29,000 µS/cm |
| Wash Water | |
| Tap Water | |
| pH | 7.66 |
| Conductivity | 662 µS/cm |
| Flow Rates | |
| Feed Flow Rate | 80 mL/min |
| Adsorber Wash Flow Rate | 5-10 mL/min |
| Transport Flow Rate | 13 mL/min |
| Separator Block Flow Rate | 5 mL/min |
| Eluent Flow Rate (per inlet, 4 inlets) | 3 mL/min |

Figure 2:
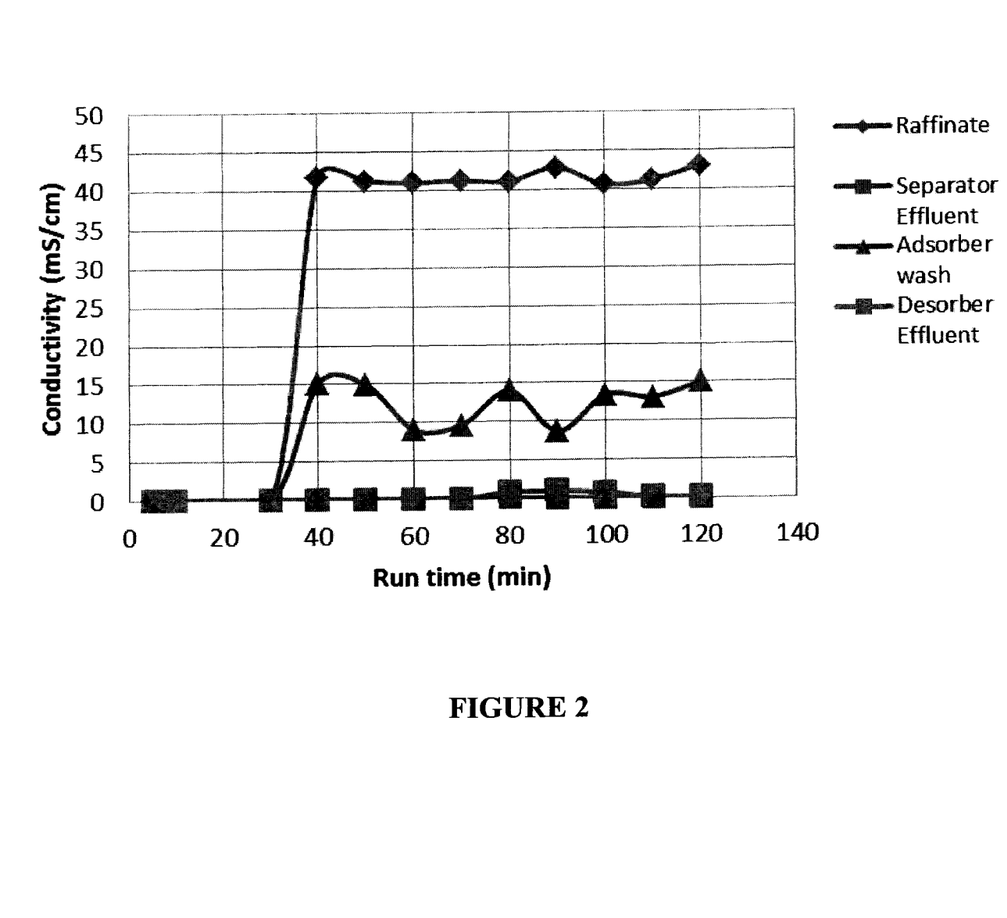
FIG. 2 graphically illustrates the conductivity when NaCl is introduced into the system at the feed inlet.
Figure 3:
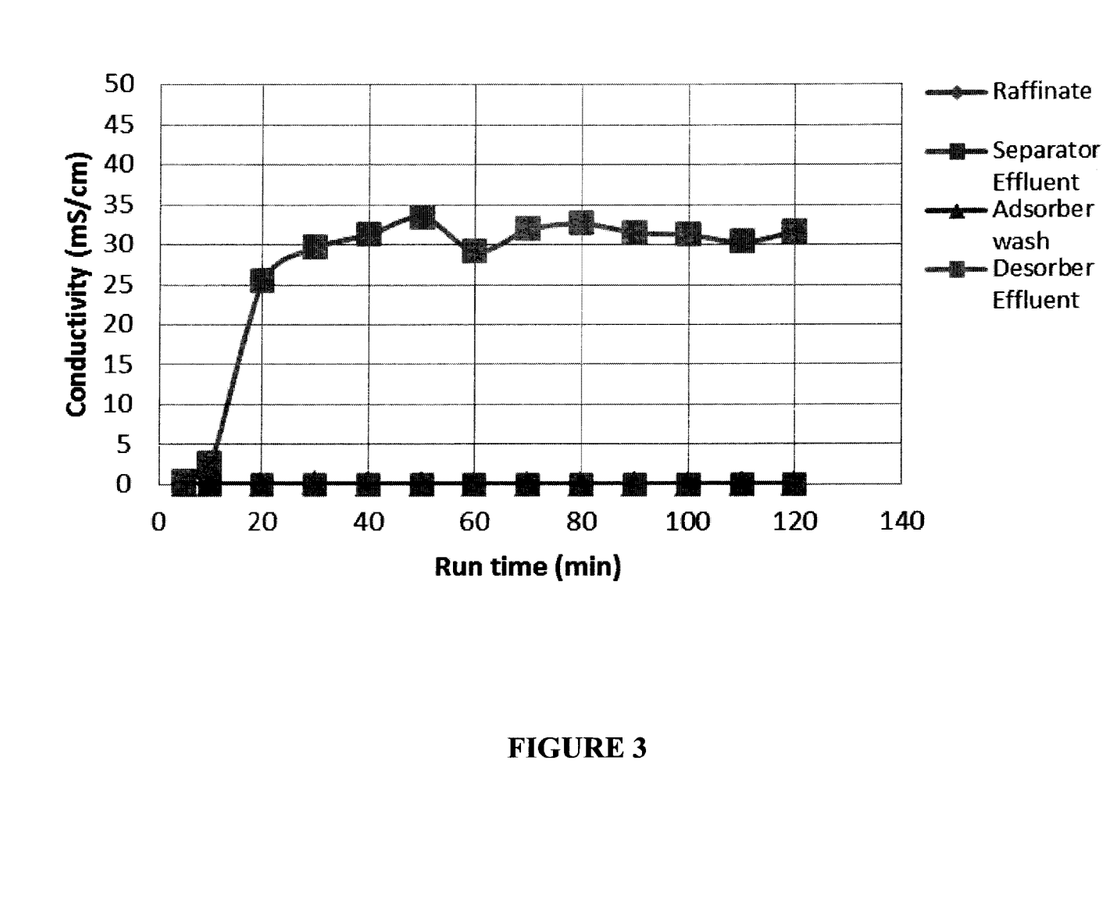
FIG. 3 graphically illustrates the conductivity when NaCl is introduced into the system at the eluent inlet.
Figure 4:
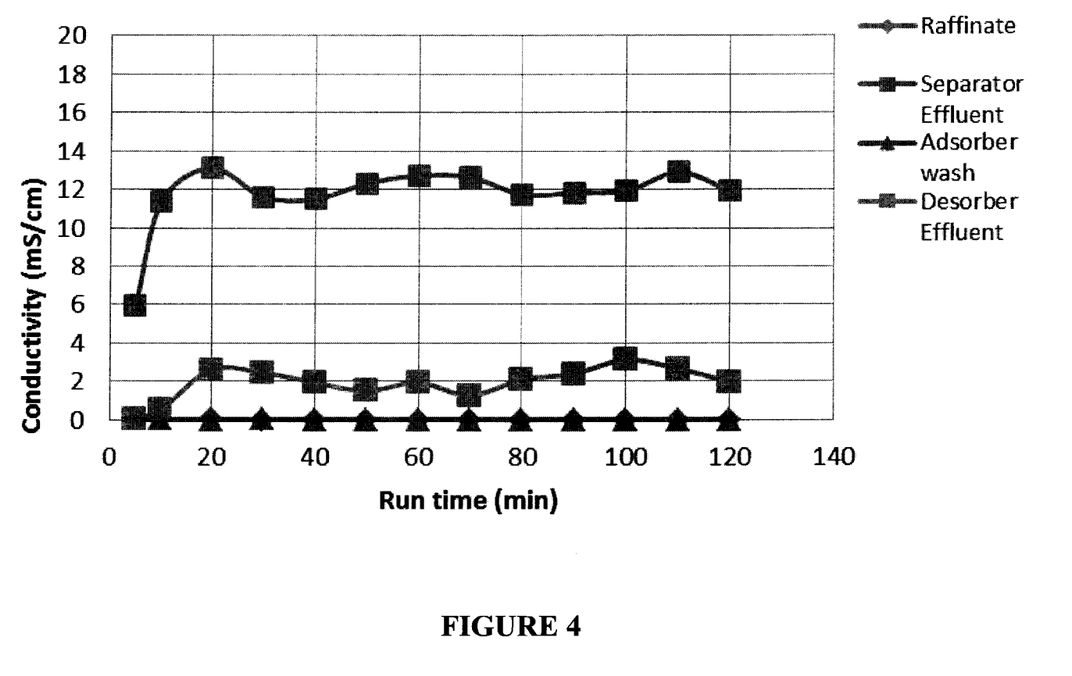
FIG. 4 graphically illustrates the conductivity when NaCl is introduced into the system at the desorber wash inlet.
Figure 5:
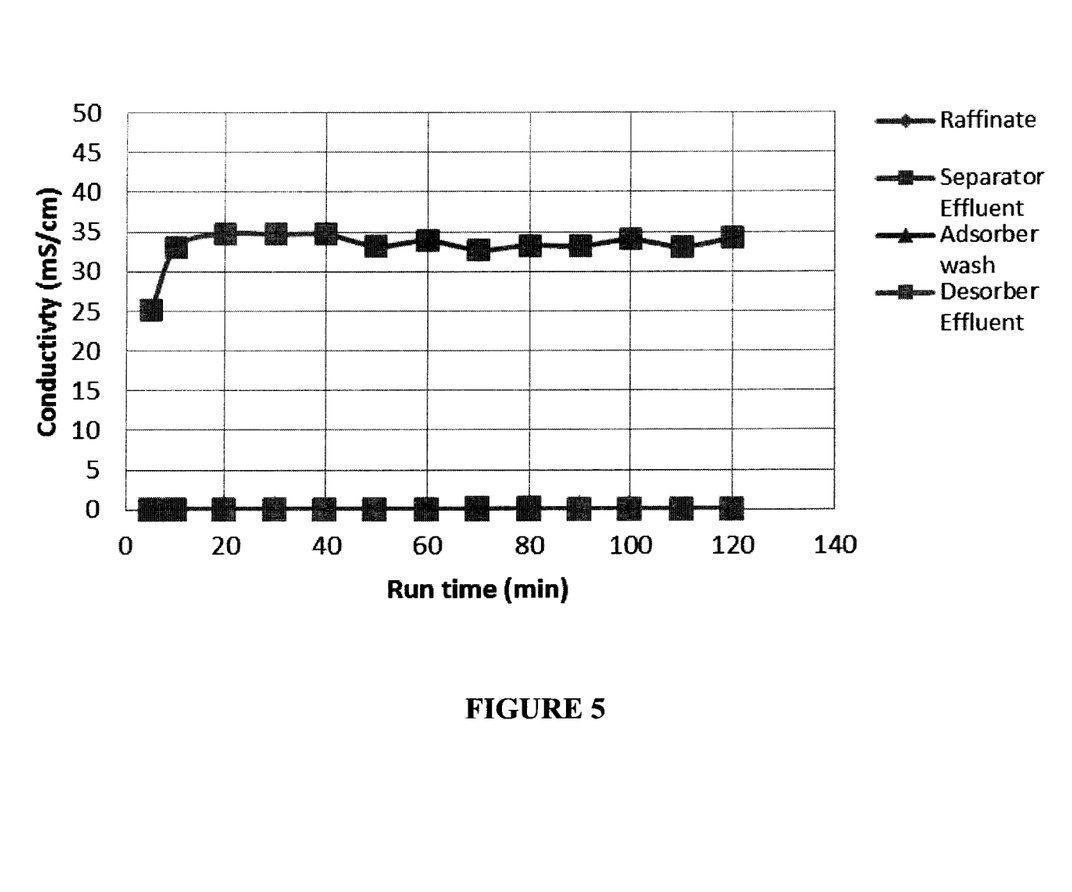
FIG. 5 graphically illustrates the conductivity when NaCl is introduced into the system at the transport fluid inlet.
Figure 6:
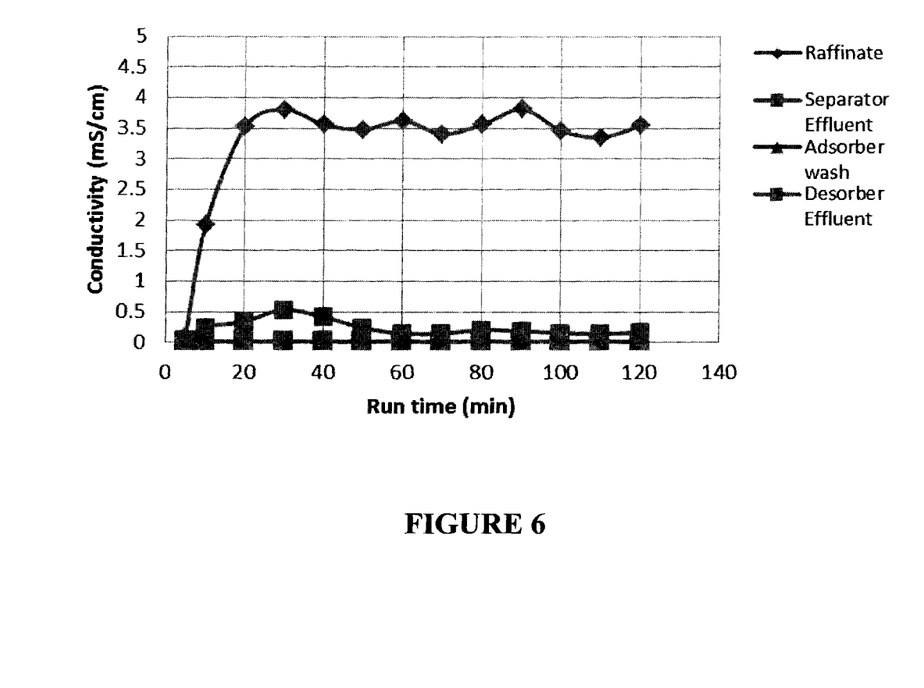
FIG. 6 graphically illustrates the conductivity when NaCl is introduced into the system at the separator block inlet.
Figure 7:
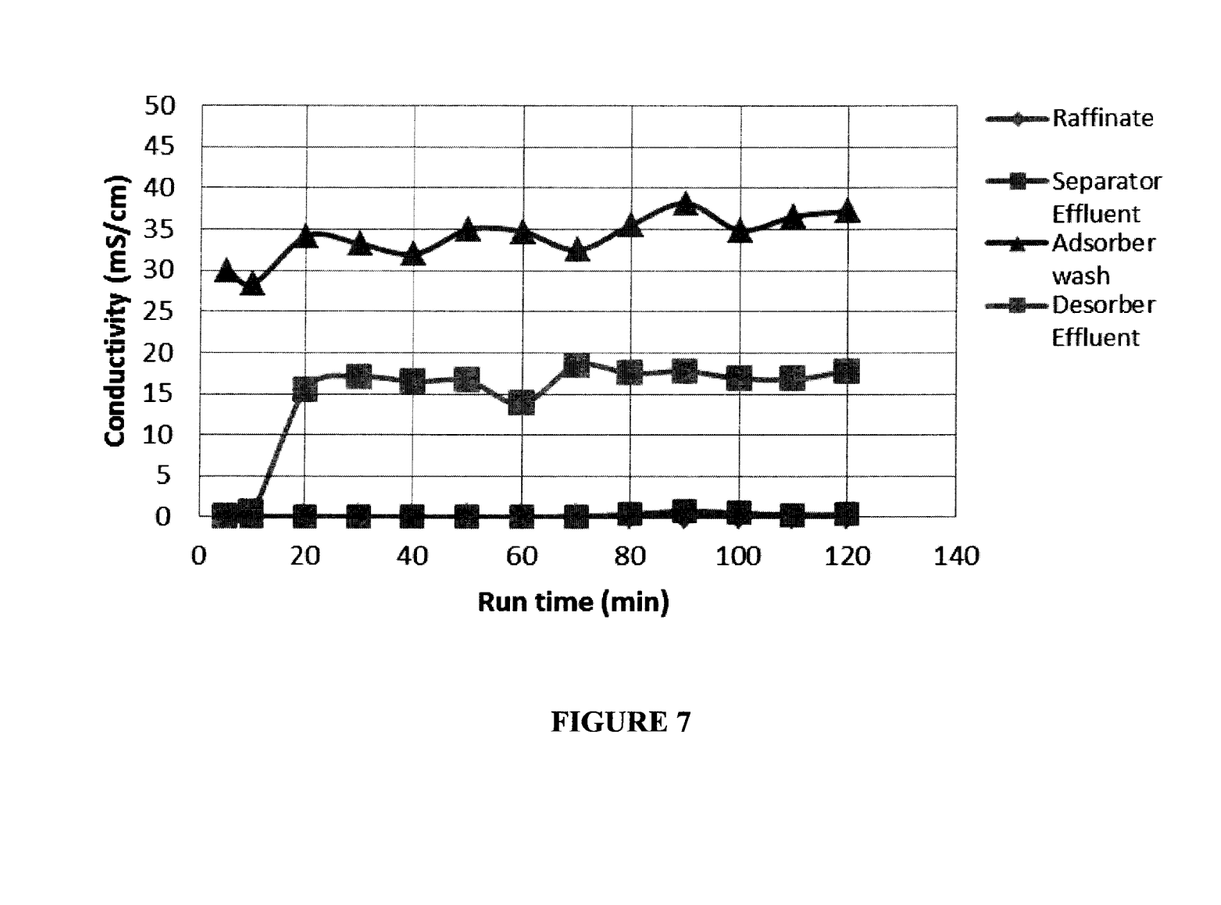
FIG. 7 graphically illustrates the conductivity when NaCl is introduced into the system at the adsorber wash inlet.

As shown in FIGS. 2 through 7, a comparison of conductivities from all system outlets during the introduction of NaCl into one inlet demonstrates the achievement of liquid and solid movement and separation. For example, FIG. 2 shows that NaCl introduced through the feed inlet can be detected primarily in the adsorber outlet and adsorber wash outlet as expected, and has minimal affect on the conductivity of the regenerator outlet or the separator outlet. FIG. 3 shows that NaCl introduced through the eluent inlets can be detected primarily in the regenerator outlet, but has minimal effect on the other outlets, as expected. Similarly, FIGS. 4 through 7 show the expected results for introduction of NaCl through the desorber wash inlet, transport fluid inlet, separator block inlet, and adsorber wash inlet, respectively. The results of this conductivity profiling clearly demonstrate that the VA-LSCFB achieves and maintains the separation and movement of liquids and solids as required.

Example 2

The Use of a VA-LSCFB Ion Exchanger with Sucrose as a Feed Liquor

Conductivity profiling was also conducted with a 20% sucrose solution using Lewatit MP 600 strong-base Type II macroporous anionic resin. Once the system was brought into steady state operation, the conductivity of all system outlets was measured for a period of 120 minutes. The following conditions were used:

TABLE 2

| Feed Solution | |
| --- | --- |
| Concentration - Sucrose | 20% |
| Temperature | 30° C. |
| pH | 7.78 |
| Conductivity | 56.5 µS/cm |
| Flow Rate | 75 mL/min |
| Wash Water | |
| Distilled Water | |
| pH | 7.66 |
| Conductivity | 21.5 µS/cm |
| Adsorber Wash Flow Rate | 5 mL/min |
| Transport Flow Rate | 13 mL/min |
| Separator Block Flow Rate | 5 mL/min |
| Eluent | |
| Concentration - NaOH | 1M |
| pH | 13.51 |
| Conductivity | 191,000 µS/cm |
| Flow Rate (per inlet, 4 inlets) | 3 mL/min |

Figure 8:
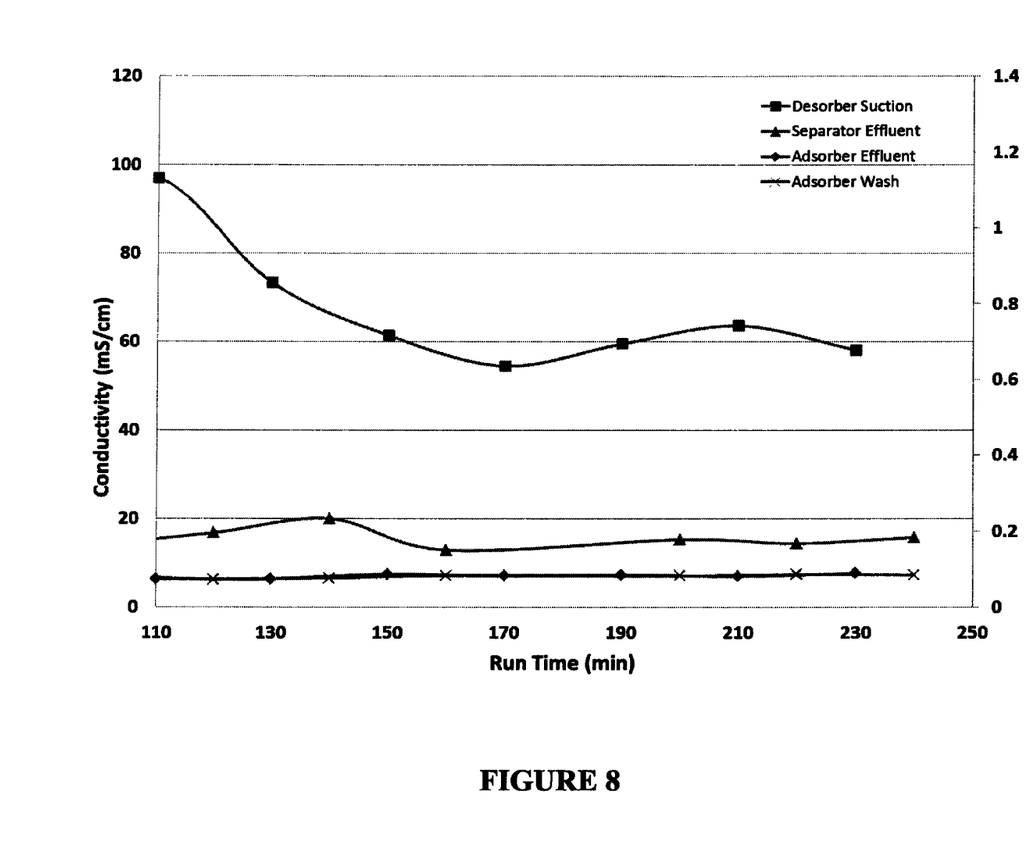
FIG. 8 graphically compares conductivities at all system outlets during steady-state operation during demineralization of a sugar solution.

As shown in FIG. 8, a comparison of conductivities from all system outlets during steady-state operation with a sucrose solution demonstrates the achievement of liquid and solid movement and separation, Example 3

Nickel Removal Using Cationic Ion Exchange

Using an apparatus and conditions similar to that described in Example 1 and 2, Lewatit 2568 strong-acid macroporous cationic resin was used to remove the target ion calcium (from $CaCl_2.2H_2O$) from an aqueous solution. After 80 minutes conditioning, the system was run for 110 minutes at an average calcium removal efficiency of 98.7%, and a conductivity profile demonstrating the achievement of liquid and solid movement and separation.

What is claimed is:

1. An apparatus for a fluidized ion exchange bed system comprising:
    a first column for housing a first fluidized bed, said first column comprising a first particle-feeding inlet to feed ion exchange or adsorbent particles into an upper region of said first column and a first fluid-feeding inlet to feed a first ion-containing fluid into a lower region of said first column to form a fluidized bed in the first column, said first column further comprising a first fluid outlet in the upper region at a height above the first particle-feeding means, said lower region being remote from said upper region such that said particles and said fluid flow counter-currently in the first fluidized bed, wherein the upper region comprises a first end of the first column and the lower region comprises a second end of the first column;
    a second column for housing a second fluidized bed, said second column comprising a second particle-feeding inlet to feed particles into an upper end of said second column and a second fluid-feeding inlet to feed a second ion-eluting fluid into a lower end of said second column to form a second fluidized bed in the second column, said second column further comprising a second fluid outlet at the upper end of the second column at a height above the second particle-feeding means, said upper and lower ends being remote such that said particles and said fluid flow counter-currently through said second column;
    a first conduit which connects the first and second fluidized beds such that the second end of said first column is connected to the upper end of said second column, said first connecting conduit being adapted to permit passage of particles and prevent passage of said first ion-containing fluid into said second column;
    a second conduit which connects the lower end of said second column to a transport section, said second connecting conduit being adapted to permit passage of particles and prevent passage of said second ion-eluting fluid, wherein said transport section connects to the upper region of the first column via a liquid-solids separator and permits hydraulic transport of said particles upwardly into the liquid-solids separator to separate the particles from fluid prior to entry into the first column via the first particle-feeding inlet.

2. The apparatus as defined in claim 1, wherein the first and second columns comprise ion exchange or adsorbent particles to form first and second fluidized beds.

3. The apparatus as defined in claim 2, wherein the particles are selected from the group consisting of cationic, anionic, weak, strong, gel-type, macroporous and dense core.

4. The apparatus as defined in claim 2, wherein the separator is connected to the first column via a third connection conduit adapted to permit passage of particles and prevent passage of fluid into said first column, wherein the third connection conduit delivers particles into the first column through the first particle-feeding inlet.

5. The apparatus as defined in claim 1, wherein the first column is situated at a height above at least a portion of the second column.

6. The apparatus as defined in claim 1, wherein the second end of the first column is substantially adjacent to the upper end of the second column.

7. The apparatus as defined in claim 1, comprising multiple second fluid-feeding inlets within the lower end of the second column.

8. The apparatus as defined in claim 1, wherein said first connecting conduit comprises a washer to wash particles from the first column before they are introduced into said second column.

9. The apparatus as defined in claim 1, wherein the second connecting conduit comprises a washer to wash particles from the second column before they are introduced into the transport section.

10. The apparatus as defined in claim 1, wherein the transport section comprises one or more fluid inlets and optionally comprises an inlet for compressed gas.

11. The apparatus as defined in claim 1, wherein the fluid outlets comprise a screen to prevent exit of said particles.

* * * * *